United States Patent [19]

Canard et al.

[11] 4,069,188

[45] Jan. 17, 1978

[54] COPOLYMERS OF BUTADIENE AND CARBOXYLATED STYRENE

[75] Inventors: Pierre Canard, Versailles; Albert Levy, Orly, both of France

[73] Assignee: Rhone-Poulenc Industries, Paris, France

[21] Appl. No.: 666,488

[22] Filed: Mar. 12, 1976

[51] Int. Cl.² .............................................. C08L 9/08
[52] U.S. Cl. ........................... 260/29.7 T; 260/29.7 H; 428/511
[58] Field of Search .................... 260/29.7 T, 29.7 H; 428/511

[56] References Cited

U.S. PATENT DOCUMENTS

| B 573,114 | 4/1976 | Xanthopoulo | 260/29.7 T |
|---|---|---|---|
| 3,513,121 | 5/1970 | Heaton | 428/511 |
| 3,966,661 | 6/1976 | Feast et al. | 260/29.7 T |

*Primary Examiner*—M. J. Welsh
*Attorney, Agent, or Firm*—McDougall, Hersh & Scott

[57] ABSTRACT

A coated substrate for photogravure printing in which the substrate is coated with an aqueous latex containing as an essential film forming component particles of a copolymer of butadiene and carboxylated styrene having a particle size within the range of 0.08–0.14 microns and consisting essentially of 41–45% by weight butadiene, 45–57% by weight styrene and 2–10% by weight of at least one unsaturated carboxylic ethylenic acid.

3 Claims, No Drawings

COPOLYMERS OF BUTADIENE AND CARBOXYLATED STYRENE

The present invention is concerned with aqueous compositions for the coating of paper and cardboard for photogravure printing, and the paper and cardboard coated with such compositions.

It is well known that aqueous compositions for the coating of paper and cardboard mainly contain pigments and binding agents. The most frequently used pigment is mineral clay. Use may also be made, in small proportions in relation to the mineral clay, of other pigments such as calcium carbonate, titanium oxide, hydrargillite, talc and barium sulphate. These pigments are dispersed in water, generally in an alkaline medium and in the presence of dispersing agents, the most prominent of which are tetrasodium pyrophosphate, sodium hexametaphosphate and polyacrylates of low molecular weight, in amounts of between 0.2 and 0.5% by weight based on the pigments. These pigments are fixed on the paper or cardboard by means of binding agents. The binding agent generally used is an queous dispersion of a synthetic polymer such as a copolymer of styrene and butadiene, an acrylic polymer or a polymer of vinyl acetate, used either alone or mixed with natural binding agents such as starches, proteins, and casein, or synthetic binding agents such as polyvinyl alcohols. It is also possible to use the aqueous dispersions in conjunction with products capable of improving the water-retaining properties of the coating compositions, examples of such products being carboxymethyl cellulose or alginates.

Finally, the coating compositions may contain various other ingredients: in particular, cross-linking agents, anti-foaming agents, slip-inducing agents, bluing agents and colorants.

The paper or cardboard is coated with the aqueous compositions by means of a coating machine based on any one of various known techniques and involving various arrangements, among which may be mentioned those known industrially under the names: air blade, size press, Champion coating machine, Massey coating machine and the trailing spreader apparatus. After the paper or cardboard has been coated, it is dried.

Photogravure printing, in which the ink used is liquid, does not require the use of a paper or cardboard having a high dry-tear strength; the quantity of binding agent to be used is smaller than in offset printing, and generally lies within the range of 5 to 7 parts by weight per 100 parts by weight of pigment.

The quality of the photogravure printing depends upon the quantity of points missing on the print. In the photogravure printing process, the ink in fact is contained in small cavities, and it transfers to the paper or cardboard by capillary action, which can take place only if the zone surrounding each cavity is in perfect contact with the paper or cardboard. It is therefore important to use a paper or cardboard having very great smoothness. A good method of evaluating the aptitude of a paper or cardboard for receiving a photogravure print, and particularly of determining the risk of the occurrence of missing points, is constituted by the heliotest which will hereinafter be described.

The lower the quantity of binding agent contained in the paper or cardboard, the higher will be the gloss obtained in calandering. It is therefore advantageous to use a film-forming constituent, the binding capacity of which is as high as possible so that this constituent can be used in the lowest possible quantity, it being understood that it is necessary to use enough of the constituent to prevent the paper or cardboard from suffering the phenomenon of dusting during calandering, printing or preparation of the prints.

According to the invention, the compositions contain, as the principle film-forming constituent, an aqueous latex of a copolymer of butadiene and of carboxylized styrene, consisting of 41 to 45% by weight of butadiene, 45 to 57% by weight of styrene, and 2 to 10% by weight of at least one unsaturated carboxylic ethylenic acid, the particles of which have a diameter of between 0.08 and 0.14 microns.

By using the minimum quantity of film-forming constituent, which performs the function of a binding agent, the compositions forming the subject matter of the invention enable coated paper or cardboard to be obtained that has an adequate dry tear strength and is very suitable for use in photogravure printing.

To enable the compositions of the invention to be used in an efficient manner, the quantity of carboxylic acid in the copolymer is in the range from 3 to 6% by weight. The unsaturated carboxylic ethylenic acids used in accordance with the invention include in particular acrylic acid, methacrylic acid, itaconic acid and fumaric acid.

The following Examples are given to illustrate the invention and provide comparative data.

EXAMPLES 1 to 12

Aqueous coating compositions were prepared, and a coating of 10 g/m$^2$, in terms of dry substance (dry solids by weight), of each of the said compositions was applied to a paper weighing 52 g/m$^2$ with the aid of a coating machine of the trailing spreader type. The coated paper was dried in a drying tunnel at a temperature of 100° C and then was calandered by four successive passes through two rolls under a pressure of 80 kg/cm.

After drying and calandering, the coated paper was conditioned at a temperature of 20° C in an atmosphere having a relative humidity of 65%, and the paper was then examined for dry tear strength and suitability for use in photogravure printing (heliotest), with the aid of the following methods:

Dry-tear strength was determined on the IGT apparatus designed by the Institute von Grafische Technik, in which the paper is adjusted to a selected value, and the speed of which is increased until incipient tearing of the inked coating was observed. Dry-tear strength was determined by the value for the speed at which tearing begins. The ink was the graduated absorption "3800" ink sold by Etablissements Lorilleux Lefranc.

Suitability for use in photogravure printing (heliotest).

Use was made of a half-tone roller on which were provided cavities of varying sizes, and by means of which, using the IGT apparatus, printing was carried out on the paper under examination. The cavity size below which transfer did not occur was then determined. The smaller the size, the better is the printing. Since the size of the cavities diminishes uniformly over the roller, the result of the measurement corresponds to a distance over the printing zone. The greater the distance indicated, the greater the suitability of the material for printing. The distance is indicated in mm.

The following Table 1 gives the details of the latexes A, B, C, D, E, F, G, H, I, J, K and L at 50% dry solids by weight of butadiene copolymers and of carboxylized styrene, as used in Examples 1 to 12 respectively.

Examples 1 to 6 and each of the Examples 7 to 12 respectively.

TABLE 3

| Test | Parts by weight of copolymer of butadiene and carboxylized styrene per 100 parts by weight of pigment | Example Latex | 1 A | 2 B | 3 C | 4 D | 5 E | 6 F |
|---|---|---|---|---|---|---|---|---|
| 1 | 3 | IGT dry (cm/s) | <30 | <30 | 30 | 34 | <30 | <30 |
|   |   | Heliotest (mm) | 56 | 60 | 65 | 75 | 64 | 68 |
| 2 | 4 | IGT dry (cm/s) | <30 | 32 | 37 | 38 | 30 | 36 |
|   |   | Heliotest (mm) | 48 | 56 | 60 | 64 | 56 | 62 |
| 3 | 5 | IGT dry (cm/s) | 30 | 40 | 43 | 46 | 40 | 43 |
|   |   | Heliotest (mm) | 40 | 46 | 50 | 56 | 50 | 54 |
| 4 | 6 | IGT dry (cm/s) | 40 | 42 | 54 | 58 | 50 | 55 |
|   |   | Heliotest (mm) | 35 | 40 | 46 | 50 | 42 | 48 |
| 5 | 7 | IGT dry (cm/s) | 60 | 64 | 64 | 64 | 70 | 75 |
|   |   | Heliotest (mm) | <30 | 32 | 36 | 40 | <30 | 44 |

TABLE 4

| Test | Parts by weight of copolymer of butadiene and carboxylized styrene per 100 pats by weight of pigment | Example Latex | 7 G | 8 H | 9 I | 10 J | 11 K | 12 L |
|---|---|---|---|---|---|---|---|---|
| 1 | 3 | IGT dry (cm/s) | 34 | 38 | <30 | 32 | 40 | 43 |
|   |   | Heliotest (mm) | 72 | 81 | 72 | 78 | 86 | 92 |
| 2 | 4 | IGT dry (cm/s) | 42 | 44 | 34 | 39 | 44 | 46 |
|   |   | Heliotest (mm) | 66 | 72 | 63 | 70 | 77 | 82 |
| 3 | 5 | IGT dry (cm/s) | 46 | 48 | 40 | 45 | 48 | 52 |
|   |   | Heliotest (mm) | 58 | 64 | 55 | 62 | 68 | 72 |
| 4 | 6 | IGT dry (cm/s) | 60 | 68 | 70 | 80 | >100 | >100 |
|   |   | Heliotest (mm) | 54 | 56 | 48 | 56 | 59 | 63 |
| 5 | 7 | IGT dry (cm/s) | 77 | 82 | 82 | >100 | >100 | >100 |
|   |   | Heliotest (mm) | 46 | 48 | 40 | 48 | 54 | 56 |

TABLE 1

| Ex. | Latex | Butadiene by weight % | Acids by weight % | Styrene by weight % | Particle diameter micron |
|---|---|---|---|---|---|
| 1 | A | 32 | 4 | 64 | 0.18 |
| 2 | B | 32 | 4 | 64 | 0.15 |
| 3 | C | 32 | 4 | 64 | 0.12 |
| 4 | D | 32 | 4 | 64 | 0.10 |
| 5 | E | 37 | 4 | 59 | 0.18 |
| 6 | F | 37 | 4 | 59 | 0.15 |
| 7 | G | 37 | 4 | 59 | 0.12 |
| 8 | H | 37 | 4 | 59 | 0.10 |
| 9 | I | 43 | 4 | 53 | 0.18 |
| 10 | J | 43 | 4 | 53 | 0.15 |
| 11 | K | 43 | 4 | 53 | 0.12 |
| 12 | L | 43 | 4 | 53 | 0.10 |

Table 2 shows the nature and the quantity by weight of the solid constituents of the coating compositions corresponding to each of the Examples. The coating compositions were adjusted to a pH-value of 8.5 by the addition of ammonia. They were adjusted to contain 60% by weight of dry substance. For each example, five tests were carried out, corresponding to five different contents of copolymer of butadiene and of carobylized styrene.

TABLE 2

|   | Test 1 | Test 2 | Test 3 | Test 4 | Test 5 |
|---|---|---|---|---|---|
| Kaolin | 100 | 100 | 100 | 100 | 100 |
| Sodium pyrophosphate | 0.4 | 0.4 | 0.4 | 0.4 | 0.4 |
| Copolymer of butadiene and carboxylized styrene | 3 | 4 | 5 | 6 | 7 |

Tables 3 and 4 below show the properties of the coated paper for each of the five tests on each of the The aqueous coating compositions that enable a satisfactory quality of coated paper for use in photogravure printing to be obtained are those for which, under the test conditions herein used, the dry tear strength is at least 40 cm/s, and the suitability for printing (heliotest) is the best.

Examples 1, 2, 3, 4, 5, 6, 7, 8, 9 and 10 are given for comparison purposes, Examples 11 and 12 are in accordance with the invention. It will be seen that, of the various latexes studied, only the latexes K and L, used in Examples 11 and 12, enable aqueous compositions to be obtained that result in a coated paper of satisfactory quality for photogravure printing, even when only three parts by weight of binding agent per 100 parts by weight of pigment is used.

We claim:

1. An aqueous composition suitable for coating paper and cardboard for photogravure printing comprising an aqueous latex containing as the essential film-forming ingredient a copolymer of butadiene and carboxylated styrene, consisting essentially of 41 to 45% by weight of butadiene, 45 to 57% by weight of styrene and 2 to 10% by weight of at least one unsaturated carboxylic ethylenic acid, the particles of which have a diameter in the range of 0.08 to 0.14 micron.

2. A composition according to claim 1 in which the quantity of carboxylic acid in the copolymer is from 3 to 6% by weight.

3. A composition according to claim 1 in which the carboxylic acid is selected from the group consisting of acrylic acid, methacrylic acid, itaconic acid and fumaric acid.

* * * * *